US011558452B2

United States Patent
Boshev et al.

(10) Patent No.: US 11,558,452 B2
(45) Date of Patent: *Jan. 17, 2023

(54) TRANSPARENT MULTIPLE AVAILABILITY ZONES IN A CLOUD PLATFORM

(71) Applicant: SAP SE, Walldorf (DE)

(72) Inventors: Stoyan Zhivkov Boshev, Sofia (BG); Diyan Asparuhov Yordanov, Sofia (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,810

(22) Filed: May 20, 2021

(65) Prior Publication Data

US 2022/0377135 A1    Nov. 24, 2022

(51) Int. Cl.
*G06F 15/16* (2006.01)
*H04L 67/1001* (2022.01)
*H04L 61/4511* (2022.01)

(52) U.S. Cl.
CPC ...... *H04L 67/1001* (2022.05); *H04L 61/4511* (2022.05)

(58) Field of Classification Search
None
See application file for complete search history.

(56) References Cited

U.S. PATENT DOCUMENTS

| | | | |
|---|---|---|---|
| 8,019,860 B2 | 9/2011 | Ivanov et al. | |
| 8,078,922 B2 | 12/2011 | Yordanov et al. | |
| 8,261,272 B2 | 9/2012 | Yordanov | |
| 8,527,992 B2 | 9/2013 | Dokovski et al. | |
| 8,782,676 B2 | 7/2014 | Dokovski et al. | |
| 8,898,220 B2 | 11/2014 | Grigorov et al. | |
| 9,274,783 B2 | 3/2016 | Valkov et al. | |
| 9,432,398 B2 | 8/2016 | Iliev et al. | |
| 9,471,336 B2 | 10/2016 | Neichev et al. | |
| 9,503,447 B2 | 11/2016 | Manolov et al. | |

(Continued)

OTHER PUBLICATIONS

U.S. Appl. No. 17/067,223, Boshev, filed Oct. 9, 2020.

(Continued)

*Primary Examiner* — Razu A Miah
(74) *Attorney, Agent, or Firm* — Fish & Richardson P.C.

(57) ABSTRACT

The present disclosure relates to computer-implemented methods, software, and systems for managing cloud application in a transparent multiple availability zone cloud platform. A request to access a cloud application running on the multiple availability zone cloud platform is received. The request can include an application location for accessing the cloud application. A network address corresponding to the application location is determined. In response to determining the network address, a first availability zone of the multiple availability zone cloud platform that is currently active to process the request is determined. A plurality of network locations corresponding to a host component of the application location is determined by a first load balancer. A network location of the plurality of network locations for processing the request is identified based on load balancing criteria. The received request is provided to the identified network location for processing by a first instance of the cloud application.

19 Claims, 7 Drawing Sheets

(56) References Cited

U.S. PATENT DOCUMENTS

| | | |
|---|---|---|
| 9,602,521 B2 | 3/2017 | Iliev et al. |
| 9,614,730 B2 | 4/2017 | Boshev et al. |
| 9,665,416 B1 | 5/2017 | Boshev et al. |
| 9,826,035 B2 | 11/2017 | Genevski et al. |
| 10,067,808 B2 | 9/2018 | Boshev et al. |
| 10,084,839 B2 | 9/2018 | Boshev et al. |
| 10,191,818 B2 | 1/2019 | Boshev et al. |
| 10,198,330 B2 | 2/2019 | Boshev et al. |
| 10,261,872 B2 | 4/2019 | Boshev et al. |
| 10,275,346 B2 | 4/2019 | Boshev et al. |
| 10,411,975 B2* | 9/2019 | Martinez ................. H04L 41/40 |
| 10,528,624 B2 | 1/2020 | Boshev |
| 10,826,965 B2 | 11/2020 | Boshev |
| 10,880,189 B2* | 12/2020 | Martinez ............. H04L 41/5077 |
| 2012/0222084 A1* | 8/2012 | Beaty ................. G06F 11/3409 726/1 |
| 2013/0160132 A1 | 6/2013 | Genova et al. |
| 2014/0164617 A1* | 6/2014 | Jalan ....................... H04L 67/10 709/226 |
| 2014/0169168 A1* | 6/2014 | Jalan .................. H04L 67/1002 370/235 |
| 2015/0215308 A1* | 7/2015 | Manolov ............. H04L 67/1036 709/229 |
| 2017/0302589 A1* | 10/2017 | Leafe .................. H04L 47/2433 |
| 2018/0054475 A1* | 2/2018 | Agarwal ............. H04L 43/0817 |
| 2018/0063258 A1* | 3/2018 | Wang ...................... H04L 67/36 |
| 2018/0131583 A1* | 5/2018 | Barrows ............... H04L 67/306 |
| 2018/0150356 A1* | 5/2018 | Boshev ................. G06F 11/203 |
| 2018/0165070 A1* | 6/2018 | Khambay ................. G06F 8/36 |
| 2018/0167453 A1* | 6/2018 | Luo ..................... H04L 43/0817 |
| 2019/0073600 A1 | 3/2019 | Boshev et al. |
| 2020/0310928 A1 | 10/2020 | Neichev et al. |
| 2022/0019596 A1* | 1/2022 | Ocher .................. G06F 16/254 |

OTHER PUBLICATIONS

U.S. Appl. No. 17/068,245, Boshev, filed Oct. 12, 2020.
U.S. Appl. No. 17/098,618, Boshev et al., filed Nov. 16, 2020.
U.S. Appl. No. 17/169,754, Yousouf et al., filed Feb. 8, 2021.
U.S. Appl. No. 17/169,787, Yousouf et al., filed Feb. 8, 2021.
U.S. Appl. No. 17/170,105, Yousouf et al., filed Feb. 8, 2021.
U.S. Appl. No. 17/170,166, Yousouf et al., filed Feb. 8, 2021.
U.S. Appl. No. 17/208,496, Boshev et al., filed Mar. 22, 2021.
U.S. Appl. No. 17/208,558, Boshev et al., filed Mar. 22, 2021.

* cited by examiner

TRANSPARENT MULTIPLE AVAILABILITY ZONES IN A CLOUD PLATFORM

TECHNICAL FIELD

The present disclosure relates to computer-implemented methods, software, and systems for data processing in a cloud environment.

BACKGROUND

Software complexity is increasing and causes changes to lifecycle management and maintenance of software applications and platform systems. Customer's needs are transforming, with increased requests for flexibility in terms of processes and landscapes, and also for high availability to access software resources provided by the underlying platform infrastructure. A failure in the network connectivity or in the underlying infrastructure may cause disruptions when providing services by the software applications and reduction in their availability and performance.

SUMMARY

The present disclosure involves systems, software, and computer implemented methods for managing cloud application in a transparent multiple availability zone cloud platform.

One example method may include operations such as receiving a request to access a cloud application running on the multiple availability zone cloud platform, wherein the request includes an application location for accessing the cloud application; determining a network address corresponding to the application location of the cloud application; in response to determining the network address, determining a first availability zone of the multiple availability zone cloud platform that is currently active to process the request; at a first load balancer of the first availability zone, determining a plurality of network locations corresponding to a host component of the application location; identifying a network location of the plurality of network locations for processing the request, wherein the network location is identified based on load balancing criteria of the multiple availability zone cloud platform, wherein the network location is associated with one of a plurality of availability zones of the multiple availability zone cloud platform; and providing the received request to the identified network location for processing by a first instance of the cloud application.

Implementations can optionally include one or more of the following features. In some instances, the application location is a uniform resource locator (URL), and wherein the network address is an Internet protocol (IP) address of a second load balancer included in a protection layer of the multiple availability zone cloud platform, wherein the protection layer is distributed between multiple availability zones.

In some instances, the second load balancer is running at the first availability zone and is configured to redirect received requests to the first load balancer to route network traffic to entities running at the multiple availability zone cloud platform.

In some instances, the multiple availability zone cloud platform can include a protection layer. The protection layer can include multiple instances of load balancers that each run at a different availability zone of the multiple availability zone cloud platform. The protection layer can provide an active-passive setup for the multiple instances of load balancers.

In some instances, the multiple availability zone cloud platform can provide access to resources running as multiple instances distributed between one or more of a plurality of availability zones of the multiple availability zone cloud platform.

In some instances, in response to receiving a request to start a new application, instances of the new application can be automatically distributed at one or more of availability zones of the multiple availability cloud platform to balance processing load at availability zones of the multiple availability cloud platform.

In some instances, a first availability zone and a second availability zone of the multiple availability zone cloud platform are connected through a highly available and high speed communication network.

In some instances, the first availability zone and the second availability zones represent data centers that are hosted at two physical locations in close proximity.

In some instances, the cloud application can run on the multiple availability zone cloud platform as multiple instances running at multiple availability zones. The cloud application is associated with a database, wherein the database includes multiple instances running at one or more of the multiple availability zones of the cloud application, and wherein data between the multiple instances of the database is replicated in synchronous or asynchronous mode.

In some instances, the cloud application is running on corresponding multiple availability zones as multiple instances of the cloud application, wherein the first instance of the cloud application is accessing resources stored at a database associated with the cloud application. The cloud application may access resources at a first instance of the database. The first instance can be determined from a plurality of instances of the database based on evaluation of capacities of the plurality of instances of the database to handle requests. The instances of the database can be persisted at different availability zones and store same content.

In some instances, determining the first availability zone of the multiple availability zone cloud platform can include identifying an outage at a second availability zone of the multiple availability zone cloud platform; and in response to identifying the outage, the second availability zone can be set in a passive mode, and the first availability zone can be set in an active zone to process the request. The first availability zone can be determined to be in a currently healthy state to process requests.

In some instances, the cloud application can run on corresponding multiple availability zones as multiple instances of the cloud application including the first instance of the cloud application running at a first availability zone of the multiple availability zone cloud platform. In some instances, one or more instances of the multiple instance of the cloud application different from the first instances can be set as disabled for processing requests. The one or more instances can be associated with an outage, where the outage can be identified at one or more availability zone of the multiple availability zone cloud platform different from the first availability zone.

Other implementations of this aspect include corresponding systems, apparatus, and computer programs, configured to perform the actions of the methods, encoded on computer storage devices.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
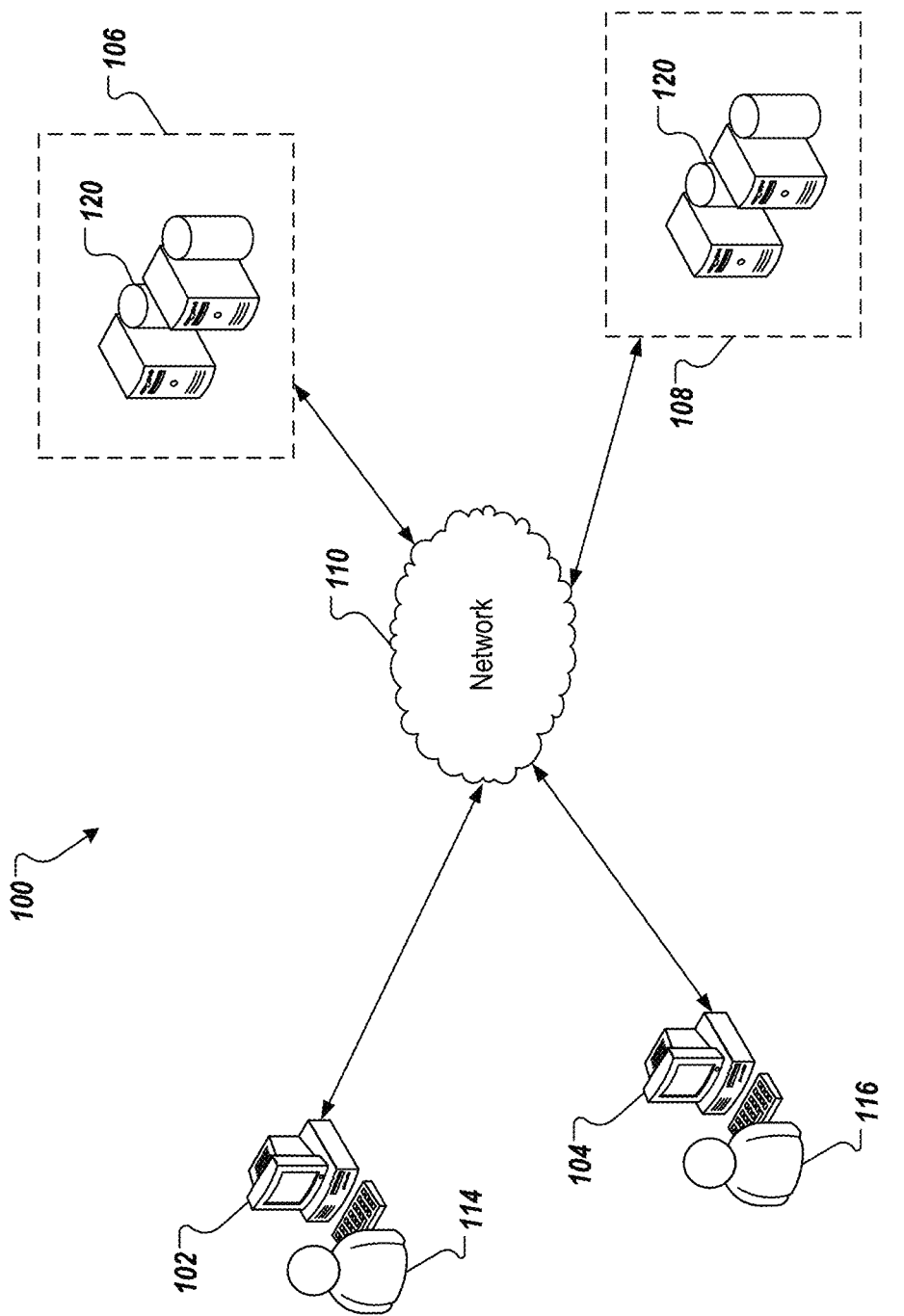
FIG. 1 illustrates an example computer system architecture that can be used to execute implementations of the present disclosure.

The present disclosure describes various tools and techniques for lifecycle management of cloud applications on a multiple availability zone cloud platform.

In some instances, cloud platforms aim to maintain a high availability solution that can scale to provide services corresponding to customers' demands. Sporadic failures of an underlying infrastructure or a network of a cloud platform may cause outages that can restrict access to services provided by the cloud platform. Configuring a cloud platform with multiple geo-distributed application deployments may be associated with a complex setup and maintenance costs.

In some instances, a cloud platform may be built to include multiple availability zones (AZs) that are connected with a highly available and high speed network. In general, each AZ can represent an independent data center associated with its own hardware which is connected to other AZs through a high availability network connection. In some instances, applications can be distributed at one or more of the AZs to provide high availability of the services provided. Since an application can be executed at different AZs and/or hardware nodes, the risks of failure to provide services through the application due to a downtime can be reduced. In some instances, to provide additional availability and reliability, the data centers (AZs) may be located at physical locations with close proximity.

In some instances, a cloud platform landscape may be configured to include multiple AZs, where one application or service may include multiple instances running in multiple different AZs. The cloud platform can be defined as a common platform to include the multiple AZs. The cloud platform can provide transparency for customers that they operate with different AZs. The cloud platform may be accessible from the outside through a single address as an entry point, for example, one IP address. Access management of cloud applications in a multiple availability zone cloud platform is of high relevance for providing applications that are highly available. Thus, a cloud platform can be configured with multiple AZs to ensure that applications can be accessed and that the applications can provide services that are available to be consumed by clients (e.g., users or other services or applications). The availability of provided services can be ensured as service execution can be routed through a path to access an application instance that is not associated with connectivity issues. Thus, performance of applications can be independent of issues originating from the underlying infrastructure or issues in one or more AZs where an instance of an application can be affected, In some instances, the cloud platform can provide automatic distribution and/or load balancing of instances of applications, service, or databases during their deployment on the cloud platform. The deployed instances can be hosted at single or multiple AZs based on a deployment strategy. For example, the deployment strategy can be predefined based on a customer prerequisite, based on a load balancing criteria, or on any other static or dynamic criteria.

In some instances, when one of the data centers experiences an issue (e.g., network connection issues, outage, etc.), the other data center(s) can be configured to continue to manage requests associated with application on the cloud platform. For example, the other data center can process incoming requests related to currently running applications, or requests for deployment of new applications. The cloud platform can be configured to manage failover of services/applications and/or databases in an automatic manner to support reduced downtime. The transparent multiple availability zone cloud platform setup can support cross-AZ consumption of services, where an application instance from one AZ can consume data and/or services from instances running on another AZ.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110.

The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

In some instances, the cloud environment 106 and/or the cloud environment 108 can be configured in a multiple AZ architecture, where the cloud environments can correspond to data centers that are connected with a highly available network and provide high speed of communication and high network bandwidth for data exchange. In some instances, the data centers can be located in close physical proximity. In some instances, a multiple availability zone cloud platform can be defined on top of the two cloud environments 106 and 108 to provide a common cloud platform that can make it transparent for uses and customers that the operations are performed on multiple AZs. The cloud platform may receive requests for running applications, services, and/or databases that can run on cloud environment 106 and/or cloud environment 108. These applications, services, and databases may be designed, developed, executed, and maintained in relation to different customers and based on configured accounts that define process execution for the applications, the services, and the database.

Figure 2:
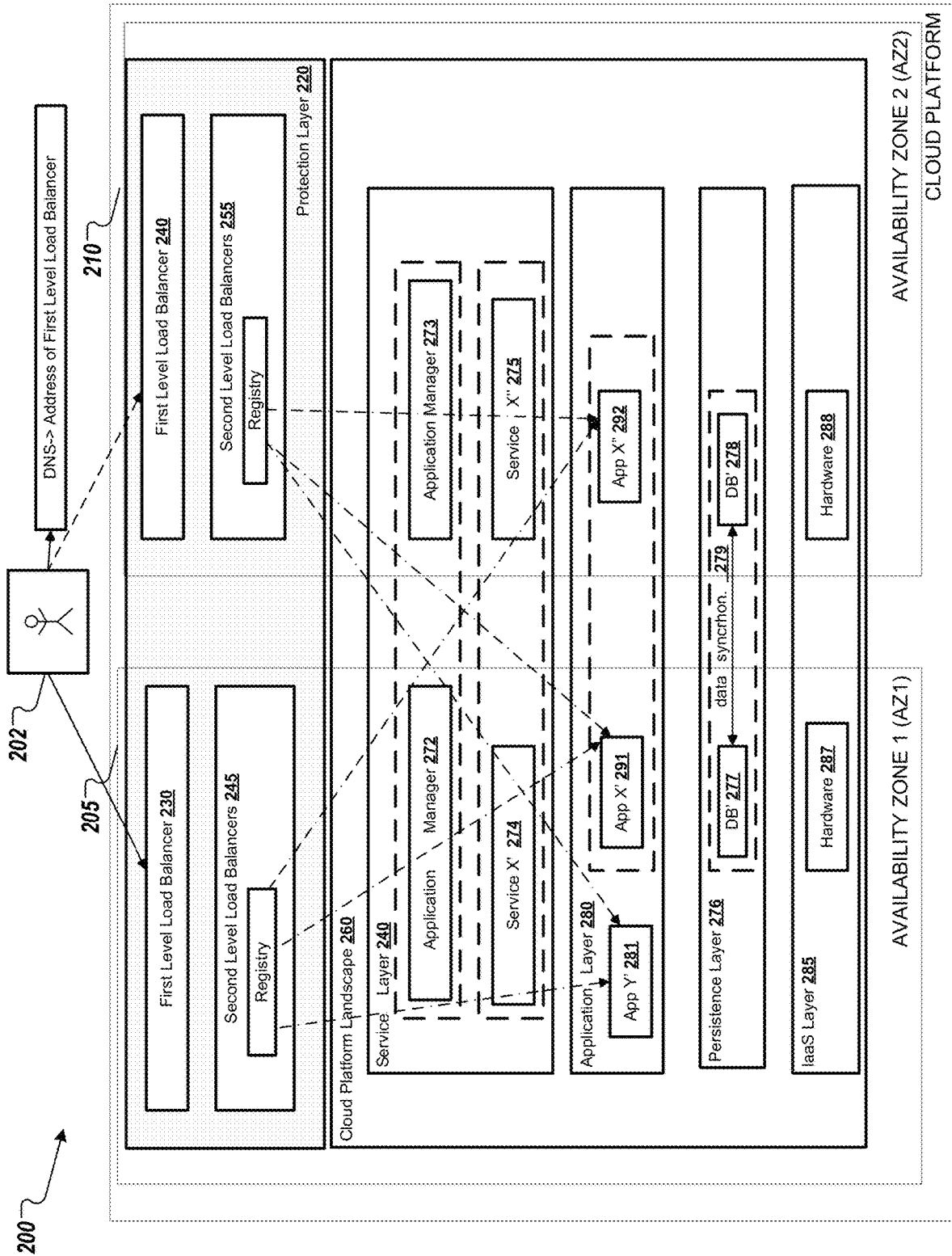
FIG. 2 is a block diagram for an example cloud platform environment including multiple availability zones that are provided with tools and techniques to manage deployment and maintenance of applications and services in the different zones in accordance with implementations of the present disclosure.

FIG. 2 is a block diagram for an example cloud platform environment 200 including multiple availability zones that are provided with tools and techniques to manage deployment and maintenance of applications and services in the different zones in accordance with implementations of the present disclosure.

In some instances, the cloud platform 200 is a multiple availability zone cloud platform that include multiple data center that can correspond to the cloud environment 106 and/or the cloud environment 108 of FIG. 1. The cloud platform 200 can include multiple AZs, although only two are illustrated in FIG. 2. In some instances, the multiple AZs can be defined as multiple data centers that can execute multiple instances of a single application, service, and/or databases.

In some instances, the cloud platform 200 include a first AZ (AZ1) 205 and a second AZ (AZ2) 210. In some instances, the cloud platform 200 provides services through deployed application(s). In some instances, a particular application can be deployed as a single AZ application or as a multiple AZ application. In cases where an application is deployed as a multiple AZ application, the application can be deployed with at least two instances on each of the two AZs, or where three or more AZs are available, on at least two of the AZs, if not on all.

In some instances, a multiple instance cloud application can include a first instance running at the AZ1 205 and a second application instance running at AZ2 210. In some instances, a customer (for example, customer 202) may communicate with the application and request to access the application. The customer can communicate with the application through a first instance at the AZ 205 or through a second instance at the AZ2. A request for the application can be dispatched to either one of the AZs based on dispatch criteria that can include one or more requirements for processing a request at a particular instance of the application. For example, a request for accessing the application can be dispatched to an instance of the application that has least number of requests that are currently being processed. A determination of an instance of the application to handle a request can be based on evaluation of data associated with the multiple instances of the application. In some instances, the cloud platform can implement a scheduling algorithm for identifying instances for processing requests. For example, a scheduling algorithm may be implemented for processing request in alternative modes, based on a time schedule, based on a user account criterion, or based on availability, among other suitable examples of criteria for allocating a request to one of the multiple instances of the application.

In some instances, the two AZs—AZ1 205 and AZ2 210—can be executed as two data centers that are physically located relatively close to each other (e.g., having close physical proximity below a given threshold distance value). In cases where the two AZs are with a close physical proximity, the two AZs may experience low latency and high-speed of inter-connection when they communicate (e.g., exchange information and/or requests). In such instances, when the two AZ communicate, they can perform data replication and communication between service and application instances located in the two data centers faster and more reliably.

In some instances, the cloud platform 200 can include two data centers that are provided by an infrastructure provider, where each data center includes a protection layer 220 for handling incoming traffic and a corresponding portion of a cloud platform landscape 260.

In some instances, each of the AZs can have multiple layers including the protection layer 220 and other layers of the cloud platform landscape 260, which include a service layer 270, an application layer 280, a persistence layer 276, and an Infrastructure-as-a-Service (IaaS) layer 285.

In some instances, the IaaS layer 285 provides a virtualization layer defined on top of hardware 287 and 288 including computing and network hardware resources. The provided hardware resources can be grouped in hardware pools.

In some instances, the persistence layer 276 can include databases that can be used by services and applications running on the cloud platform 200. For example, the persistence layer 276 as illustrated includes a database persisted with two instances—DB' 277 and DB" 278.

In some instances, high availability for the databases at the persistence layer 276 can be achieved by configuring a redundant setup of database instances in which data is replicated between the instances (at data synchronization 279). In some instances, the different DB instances can be located or managed in different AZs. In some instances, and depending on the databases, the replication be performed either one or bi-directionally.

In some instances, an application and/or a service can work primarily with one of the DB instances of a given database, while in others, the application and/or service work and interact with each instance, or at least a subset of two or more instances. In some instances, the manner of communication between an application and/or a service with instances of the database can be based on the DB's capabilities. By providing flexible configuration for an application or a service to work with one or more instances of a database, processing of requests from the application or service related to the database can be performed without interruption.

In some instances, the application layer 280 includes instances of one or more customer-deployed applications. In some instances, deployment of an application at the application layer 280 can be performed according to a deployment strategy. The deployment strategy can be selected by a customer, and can support an objective of providing high availability services through the deployed application. In some instances, to provide high availability for an application that is deployed and started at the cloud platform 200, the application can be started with more than one instance (i.e., as a multiple instance application). In cases where an application is started with more than one instance, those instances can be equally and/or proportionally distributed across the two AZs. In some cases, the distribution of instances at different AZs may be performed based on a preset rule for distribution. For example, such present rule can be configured for an application by an administrator of the cloud platform 200 and/or based on input from a customer deploying the application. Further and for example, if an application is started with four instances, each AZ can include two of those instances. By deploying multiple instances for one application at each of the two AZs, the application can provide continuous services and be accessible even in cases where some of the instances experience inability to provide services, for example, due to an issue in the underlying data center where those instances run. Thus, by executing applications as multiple instance applications, downtime of applications can be reduced.

In some other instances, an application can be configured to be executed as a single AZ application that can run only in one AZ. For example, such approach can be undertaken to reduce costs for maintenance. In those instances, the single AZ application can be configured to run with multiple instances on one AZ, where the instances of the application can run on different hardware pools provided by the one AZ. In such instances, a sporadic internal hardware problem at one of the hardware pools might not affect the performance of the application, since there are instances running on different hardware pools. However, if the single AZ experience global connectivity issues or outages, the single AZ application would be affected and will experience downtime (e.g., unavailability to provide services).

In some instances, to increase availability of an application, an application can be deployed with multiple instances spread across the two AZs, where multiple instances corresponding to each of the AZs can be deployed on different hardware pools.

In some instances, the service layer 270 can include system services provided by the cloud platform 200. The service layer 270 includes an application manager service that is deployed with two instances—application manager 272 and application manager 273—at the two AZs 205 and 210. The service layer 270 can include other system services, for example, a storage service that can be deployed with instances at each of the AZs. For example, service X' 274 and service X" 275 can be examples of such an additional system service that is deployed as a multi instance service having one instance at each AZ.

In some instances, the service layer 270 can include services of the cloud platform 200 that are designated to be used by applications to support customer needs (e.g., business needs, technical requirements, and service level standards, as well as others). In some instances, system services executed at the service layer 270 can be managed by a provider of the cloud platform 200. In some instances, to improve the high availability of these services, they can be executed using more than one instance at AZ1 205 and AZ2 210. By running a system service at each of the AZs, a service instance of the system service can still provide services as running on an active AZ that does not experience issues that restrict service execution when another of the AZs experiences a failure or issue itself.

In some instances, services and applications can replicate their data across the instances in real time. Data replication can be performed with low latency based on a high-speed network connectivity between the two AZs. The replication of data between different instances of a service and/or an application is performed to maintain the same data in different instances of a database at each of the AZ. In some instances, the data replication can be performed in different ways, for example, by direct "service instance"-to-"service instance" communication, and/or based on provided support from an external service (e.g., a DB, a messaging bus, or other).

In some instances, the application layer 280 includes one application that is single AZ application—App Y—that is deployed with one instance, i.e., App Y' 281 at AZ1 205. The application layer 280 includes one application that is a multiple AZ application—App X—that is deployed with two instances, i.e., App X' 291 and App X" 292, at the two AZs.

In some instances, the cloud platform 200 includes the protection layer 220 to protect the internal network at the cloud platform from unauthorized access and attacks. The protection layer 220 can be a dedicated subnetwork for protecting the internal network by providing load balancers through which the cloud platform 200 can expose applications and services of the cloud platform to external entities. The protection layer 220, as illustrated, includes two level of load balancers, where each of those is run with two instances distributed at each of the AZs. In some instances, the first level load balancers can be used for load balancing of external traffic (e.g., the TCP traffic) to the cloud platform 200, while the second level load balancers can be used for load balancing the traffic (e.g., HTTP traffic) towards different applications, service, or databases at the cloud platform 200.

In some instances, the load balancers at the protection layer 220 perform routing of incoming traffic, including requests to access applications and/or services, to start an application, or to start an additional instance for a running application, as well as other. The first and second level load balancers are provided on the cloud platform 200 in a highly available setup of load balancers. For example, the second level load balancers that are provided on the cloud platform 200 may be load balancer provided from the BIG-IP platform of F5®. In some instances, the second level load balancers can distribute requests based on application-specific data including headers, cookies, messages, parameters, or else.

In some instances, the cloud platform landscape 260 is associated with only one external network address as an entry point. This entry point can be handled by the first level load balancers. The first level load balancers can be configured in an active-passive setup. In such instances, only an active load balancer in one of the AZs can be responsible to handle incoming traffic. In some instances, both AZs can be running and providing resources, where one of the AZ may be associated with the active first level load balancer that will handle incoming requests to the AZ related to application and or services on the cloud platform 200. In cases where one of the AZs is experiencing an outage, a first level load balancer instance at the other AZ can be automatically configured as in active mode (e.g., in case it was not the active instance).

In some instances, the second level load balancers are responsible to route the traffic to a specific application, for example, based on an application location (e.g., URL) of the application.

In some instances, when an application instance is started at the cloud platform 200, the application instance is registered in a registry of the second level load balancer. Such registry is maintained at both AZs. Based on this registry, the second level load balancer can route the traffic to different application instances. An instance of the second level load balancer can route a received request to the AZ where the instance of the second level load balancer resides, or the other AZ. Such routing is possible because the second level load balancer register information for each application (and application instance) running on the cloud platform 200 at each instance of the second level load balancer.

In some instances, when an instance of an application is associated with an outage, for example, an outage at the corresponding availability zone of the cloud platform 200, such instance can be unregistered from the register of the second level load balancer. By unregistering the instance, the instance becomes disabled. The disabling of an instance can be set in an automated manner in response to receiving an indication for a detected outage at the availability zone, or can be performed as a manual action based on user received input, or other examples of setting an instance as disabled (e.g., not available to receive and process requests). In some instances, when an instance is unregistered (or disabled), the instance does not receive redirected requests for services from the application. Rather, requests can be routed to other instances (or instance) that is registered (e.g., can be interpreted as an instance available to process requests as in a healthy mode).

In some instances, when applications are deployed and started on the cloud platform 200, they are automatically distributed across different AZs. The application manager (e.g., application manager instances 272 and 273) is responsible for the lifecycle management of applications and for registering applications at registries of the second level load balancers to provide accessibility to applications from the Internet.

In some instances, when a new application instance is started, the application manager can select one AZ where the new instance will be located. In some instances, to maintain the application's high availability, the application instances can be equally distributed across the AZs. The Application can registers the new application instance at the registry of the second level load balancers in AZ1 205 and AZ2 210.

The application manager's instances in AZ1 and AZ2 (i.e., 272, and 273) can be configured to have the same knowledge (and store the same data) about the application instances that were started and are running on the cloud platform 200. The application manager's instances can synchronize data among and between each other. For example, synchronization and data sharing can be performed by using an in-memory data grid, e.g., implemented based on HAZELCAST or any other suitable method. In some instances, the in-memory data grid can be implemented as a data grid that provides central, predicable scaling of applications through in-memory access to frequently used data through an elastically scalable data grid. In another example, synchronization can be performed by the use of a messaging bus, e.g., RabbitMQ. In yet another example, data synchronization can be performed through the use of a common database with a high availability setup with instances that are run at both AZ1 205 and AZ2 210.

Figure 3:
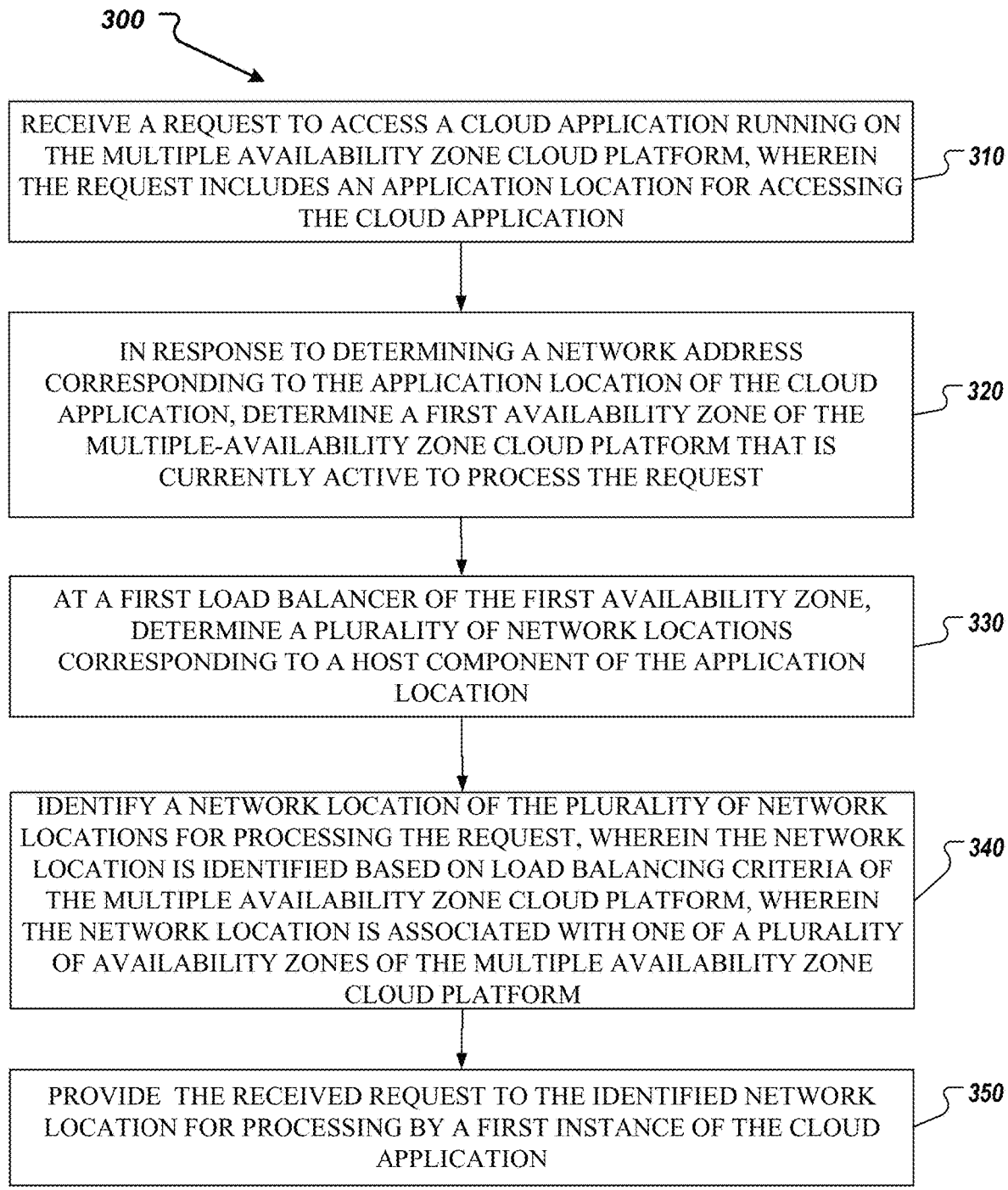
FIG. 3 is a flowchart for an example method for running cloud applications on a multiple availability zone cloud platform in accordance with implementations of the present disclosure.

FIG. 3 is a flowchart for an example method 300 for running cloud applications on a multiple AZ cloud platform in accordance with implementations of the present disclosure.

In some instances, applications (or other entities, such as services) that can be hosted in a cloud environment, and can provide services for consumption based on requests, for example, requests from end-users and/or customers. Entities running on the cloud platform may execute logic that includes processing received requests and providing responsive resources or data, dispatching received requests to other entities, querying database entities, and accessing external resources to gather data or to request services, among other examples of implemented processing logic for the cloud platform.

In some instances, the example method 300 may be executed at a multiple availability zone cloud platform that may be configured to implement logic for executing data replication to maintain consistency between storages at different AZs of the cloud platform. In some instances, the multiple availability zone cloud platform can be similar to the multiple availability zone cloud platform 200 of FIG. 2.

In some instances, a first AZ and a second AZ of the multiple availability zone cloud platform are connected through a highly available and high speed communication network. The first AZ and the second AZs can represent data centers that are hosted at two physical locations in close proximity.

At 310, a request to access a cloud application running on the multiple AZ cloud platform is received. The request includes an application location for accessing the cloud application. In some instances, the application location is defined as a uniform resource locator (URL). The multiple availability zone cloud platform can provide access to resources running as multiple instances distributed between one or more AZs of a plurality of AZs of the multiple availability zone cloud platform.

In some instances, the cloud application is running on the multiple availability zone cloud platform as multiple instances executing at multiple AZs. The cloud application can be associated with a database that includes multiple instances running at one or more of the multiple AZs of the cloud application. The application can be configured to use any one of the multiple instances of the database when providing application services. Data between the multiple instances of the database can be replicated to maintain common content, where the data replication can be executed, for example, in a synchronous or asynchronous mode. In some instances, the cloud application can be configured to access resources at a first instance of the database, where the first instance of the database is determined from the multiple instances of the database based on evaluation of capacities of the different instances to handle requests.

At 320, in response to determining a network address corresponding to the application location of the cloud application, a determination of a first AZ of the multiple availability zone cloud platform that is currently active to process the request is made. In some instances, the network address is an Internet protocol (IP) address of a second load balancer included in a protection layer of the multiple availability zone cloud platform, where the protection layer is distributed between multiple AZs. In some instances, the second load balancer is running at the first AZ and is configured to redirect received requests to the first load balancer to route network traffic to entities running at the multiple availability zone cloud platform.

In some instances, the protection layer comprises multiple instances of load balancers that each run at a different AZ of the multiple availability zone cloud platform. The protection layer can provide an active-passive setup for the multiple instances of load balancers.

In some instances, the determination of the first AZ of the multiple availability zone cloud platform can include identifying an outage at a second AZ of the multiple availability zone cloud platform. In response to the identified outage, the second AZ can be set in a passive mode. In those cases, the first AZ can be set in an active zone to process the request, since the first AZ can be determined to be in a currently healthy state to process requests.

At 330, at a first load balancer of the first AZ, a plurality of network locations corresponding to a host component of the application location is determined. In some instances, the first load balancer of the first AZ can be substantially the same in terms of functionality to the second level load balancer 245 of FIG. 2, which includes a registry of instances started on the cloud platform.

At 340, a network location of the plurality of network location for processing the request is identified. In some instances, the network location can be identified based on load balancing criteria of the multiple availability zone cloud platform. The network location is associated with one of a plurality of AZs of the multiple availability zone cloud platform. In some other instances, the network location can be identified according to a routing schedule for processing requests associated with the application. For example, different load can be configured for different instances at corresponding AZs of the multiple availability zone cloud platform.

At 350, the received request is provided to the identified network location for processing by a first instance of the cloud application.

In some instances, the method 300 can be associated with a related method for deploying a new application, where the new application can be the one that is requested with the request at 310.

In some instances, in response to receiving a request to deploy a new application, the cloud platform can automatically distribute instances of the new application at one or more AZs of the multiple availability cloud platform to balance processing load at AZs of the multiple availability cloud platform.

Figure 4:
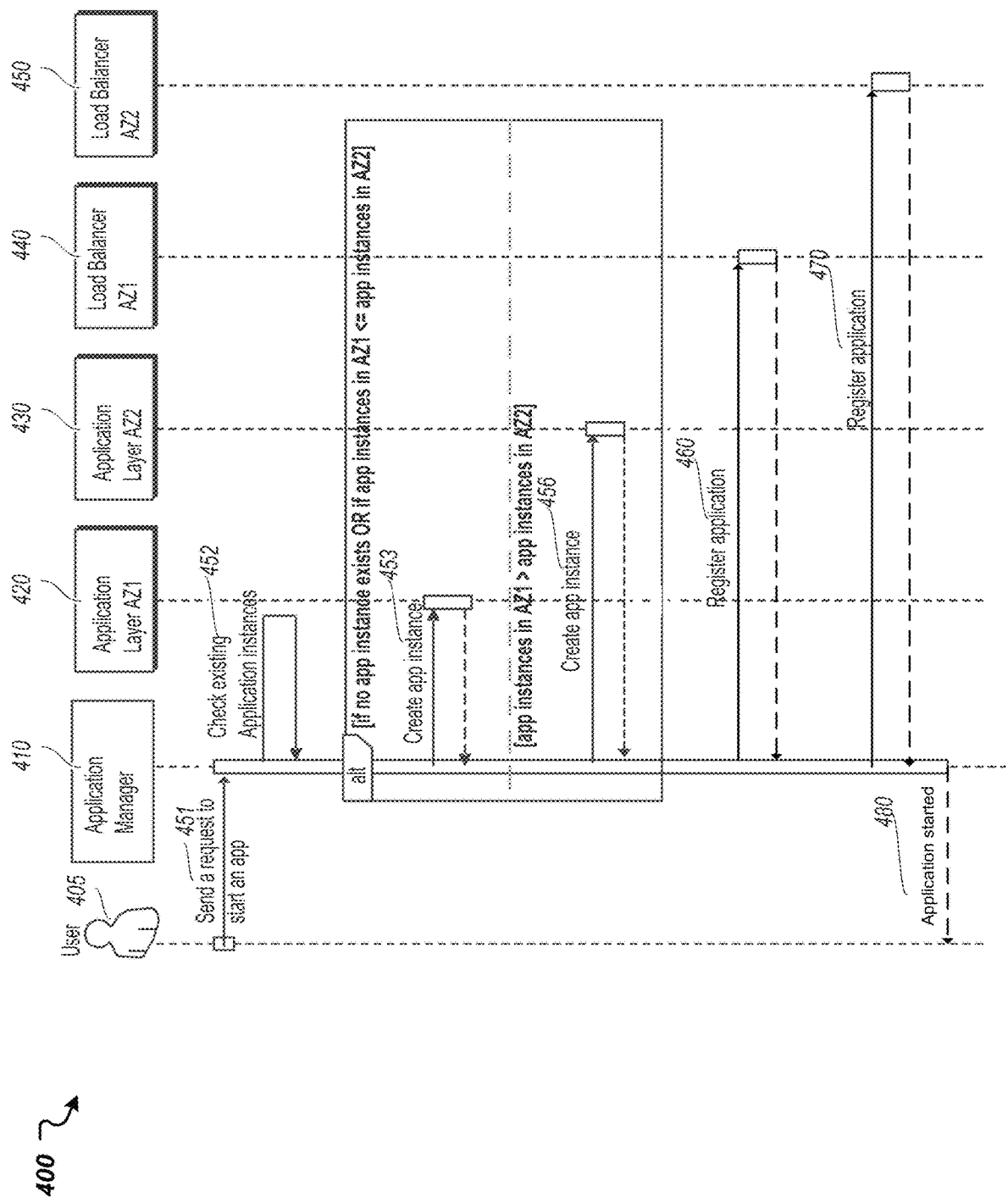
FIG. 4 is a block diagram for an example method for staring an application at a multiple availability zone cloud platform in accordance with implementations of the present disclosure.

FIG. 4 is a block diagram for an example method 400 for staring an application at a multiple availability zone cloud platform in accordance with implementations of the present disclosure. In some instances, the example method 400 can be executed on a multiple availability zone cloud platform corresponding to the cloud platform 200 of FIG. 2.

In some instances, an application can be instantiated and started at the multiple availability zone cloud platform. In some of those instances, the application is a new application to be started on the cloud platform. In some other of those instances, the request is associated with starting more instances for an already running application on the cloud platform. For example, a request to start more instances of a cloud application may be associated with a request to increase processing load that can be handled by the cloud application at the multiple availability zone cloud platform.

In some instances, in response to receiving a request to start an application and/or an application instance at the multiple availability zone cloud platform, the cloud platform can handle distribution of the application and/or the application instances automatically so that the application can run in a high availability mode.

In the illustrated method 400, the cloud platform includes two AZs for the sake of the example. In other implementations, three or more AZs can be present and included in the cloud platform.

At 451, a user (or an application) 405 can send a request to an application manager 410 of the cloud platform to start an application (e.g., as an additional instance for an already running application, or as a first instance of a new application). The application manager 410 can be an instance that is running at either one of the AZs of the cloud platform and can handle processing of incoming start requests. In some instances, the application manager 410 can be similar to the application manager 272 and the application manager 273 of FIG. 2.

At 452, the application manager 410 can determine whether there is an existing application instance of the same application that is running on the cloud platform. Based on the determination, the process proceeds to either 455 or to 454.

At 455, if it is determined that there is no application instance that exists on the cloud platform or that the number of application instances for the application at a first AZ is less than or equal to the number of instances at a second AZ of the cloud platform, then, at 453, the application manager 410 can send a request to an application layer 420 in the first AZ to create a new application instance. The application layer 420 can create an instance of the application as requested and can return a response upon successful deploy and start of the instance at the first AZ.

At 454, if it is determined that the number of application instances in the first AZ is more than the application instances in the second AZ, then, at 456, the application manager 410 can send a request to an application layer 430 in the second AZ to create a new application instance. The application layer 430 can create an instance of the application as requested and can return a response upon successful deploy and start of the instance at the second AZ.

At 460, the application manager 410 registers the new application instance in a load balancer 440 in the first AZ by adding an address of the application instance in a pool, the pool including addresses of started applications at the first AZ. The load balancer 440 can maintain a list of network addresses corresponding to instances of different cloud applications in the pool. The load balancer 440 can evaluate the list of addresses in the pool when receiving a request for an instance of a given application. In some instances, the load balancer 440 can correspond to the load balancer 245 at the first AZ of FIG. 2.

At 470, the application manager 410 registers the new application instance in a load balancer 450 in the second AZ by adding an address of the application instance in in a pool including addresses of started applications at the second AZ. The load balancer 450 can maintain a list of network addresses corresponding to instances of different cloud applications in the pool. The load balancer 450 can evaluate the list of addresses in the pool when receiving a request for an instance of a given application. In some instances, the load balancer 450 can correspond to the load balancer 255 at the second AZ of FIG. 2.

In some instances, the load balancer 440 and 450 can be load balancer responsible for handling incoming traffic to different locations within the cloud platform, for example, application instances running on the cloud platform, services, or databases.

Figure 5:
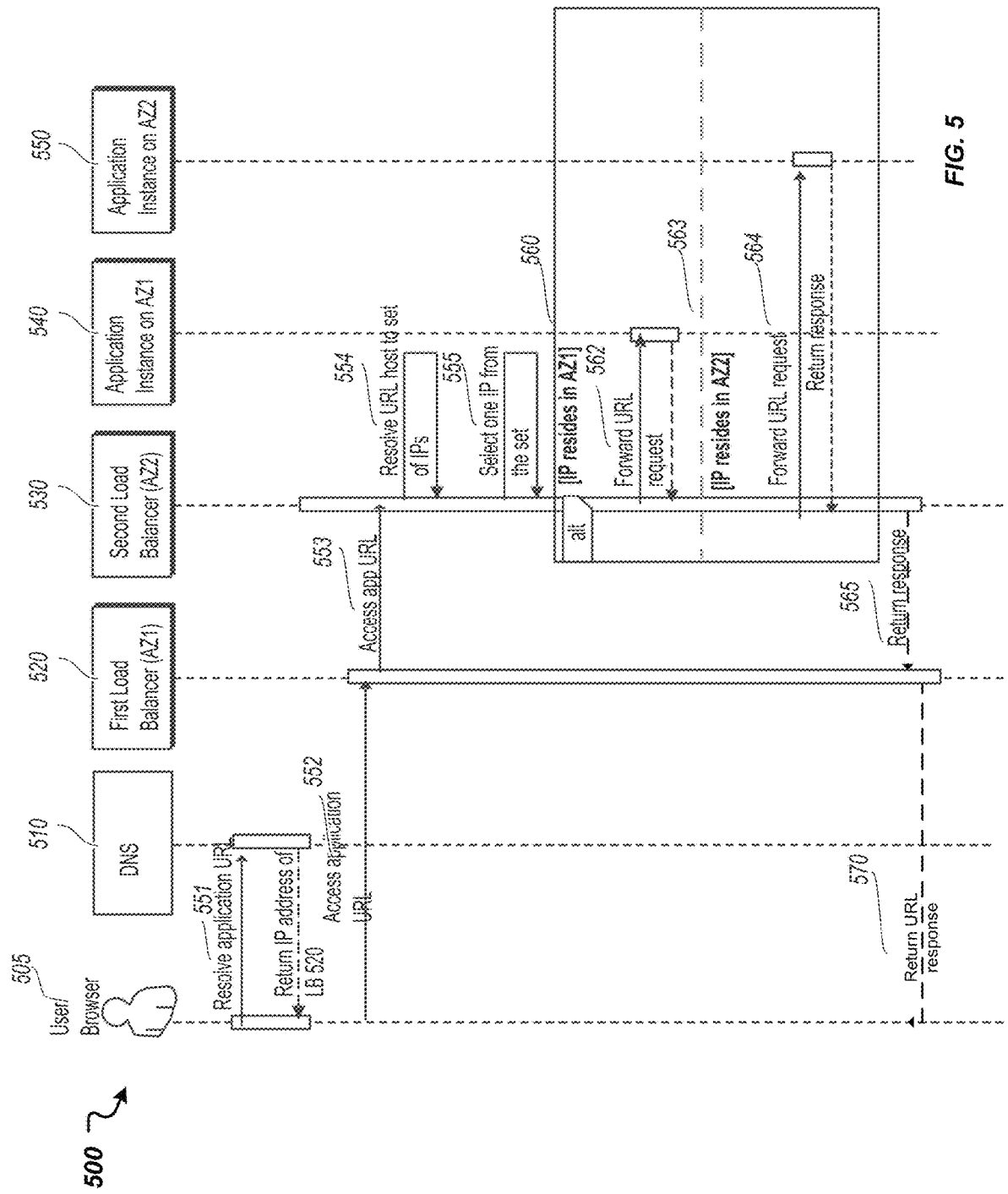
FIG. 5 is a block diagram for an example method for accessing a cloud application running in a high availability mode on a multiple availability zone cloud platform in accordance with implementations of the present disclosure.

FIG. 5 is a block diagram for an example method 500 for accessing a cloud application running in a high availability mode on a multiple availability zone cloud platform in accordance with implementations of the present disclosure. In some instances, the method for accessing the cloud application includes receiving a request for accessing and processing the request, and can at least partially correspond to the described method 300 of FIG. 3. In some instances, the example method 500 is executed at a multiple availability zone cloud platform which corresponds or is similar to the cloud platform 200 of FIG. 2.

In some instances, at 551, a request is received at a domain name system (DNS) 510 for accessing a cloud application running on the multiple availability zone cloud platform. The request can be sent from a user or from a browser application 505. The request can provide an application location, for example, defined by a uniform resource locator (URL). The DNS 510 can resolve the received application locator request, and can provide a network address of a first load balancer 520 of the multiple availability zone cloud platform. The first load balancer 520 may be a load balancer located at a first AZ of the cloud platform that is responsible for load balancing network traffic of the cloud platform. The first load balancer 520 can perform routing of incoming traffic from external entities (e.g., the request received from the user or browser 505) to the multiple availability zone cloud platform.

In some instances, the DNS 510 resolves the network address (e.g., an IP address) of the application location provided with the request 551. The DNS 510 returns the network address of the first load balancer 520 to the user or browser 505.

In some instances, in response to receiving the network address of the first load balancer 520, the user/browser 505 can send, at 552, a request to access the cloud application to the first load balancer 520. At 553, the first load balancer 520 can redirect the received request to a second load balancer 530. In some instances, the second load balancer 530 can be located at the first AZ. The second load balancer 530 is responsible for routing requests for applications and resources on the multiple availability zone cloud platform. The second load balancer 530 can dispatch received requests to applications (or application instances) at the first AZ, or to applications (or application instances) at other AZs of the multiple availability zone cloud platform. In some instances, the second load balancer 530 can include logic to process received requests based, for example, on load balancing criteria for distributing load between different zones of the multiple availability zone cloud platform.

At 554, the second load balancer 530 can resolve a host of the received application location (e.g., URL) to determine a set of application network addresses (e.g., IP addresses). The set of application network addresses can correspond to different instances of the cloud application that can be deployed at different AZs of the multiple availability zone cloud platform.

At 555, one of the application network addresses can be selected by the second load balancer 530. The selection of one of the addresses from the set may be based on any suitable algorithm or determination, such as an evaluation of current processing load of each (or a subset of) application instance of the cloud application associated with the addresses from the set. The application network address can be determined at either of the AZs and may not be limited to instances running at the first AZ where the second load balancer is located.

In some instances, based on the selected application network address at 555, the request for the cloud application can be dispatched either to the first AZ at 560, or to another AZ at 563. If the multiple availability cloud platform include application instances of the cloud application associated with the request at more than two AZs, further options for redirecting the request for the cloud application can be available (not shown on FIG. 5).

If the selected application network address (at 555) is located at the first AZ, the process 500 proceeds to 560; if the selected application network address is located at the second AZ, the process 500 proceeds to 563. At 562, the second load balancer 530 forwards the request including the application location to an instance of the cloud application 540 that is located at the first AZ. At 564, the second load balancer 530 forwards the request including the application location to an instance of the cloud application 550 that is located at a second AZ.

In some instances, the instance of the cloud application that receives the request can process the request, and a response can be returned to the second load balancer 530. Then, at 565, the second load balancer 530, returns the response from the instance, to the first load balancer, and, at 570, the first load balancer 520 returns a response to the received request. The response can then be returned at 570 to the user/browser 505.

Figure 6:
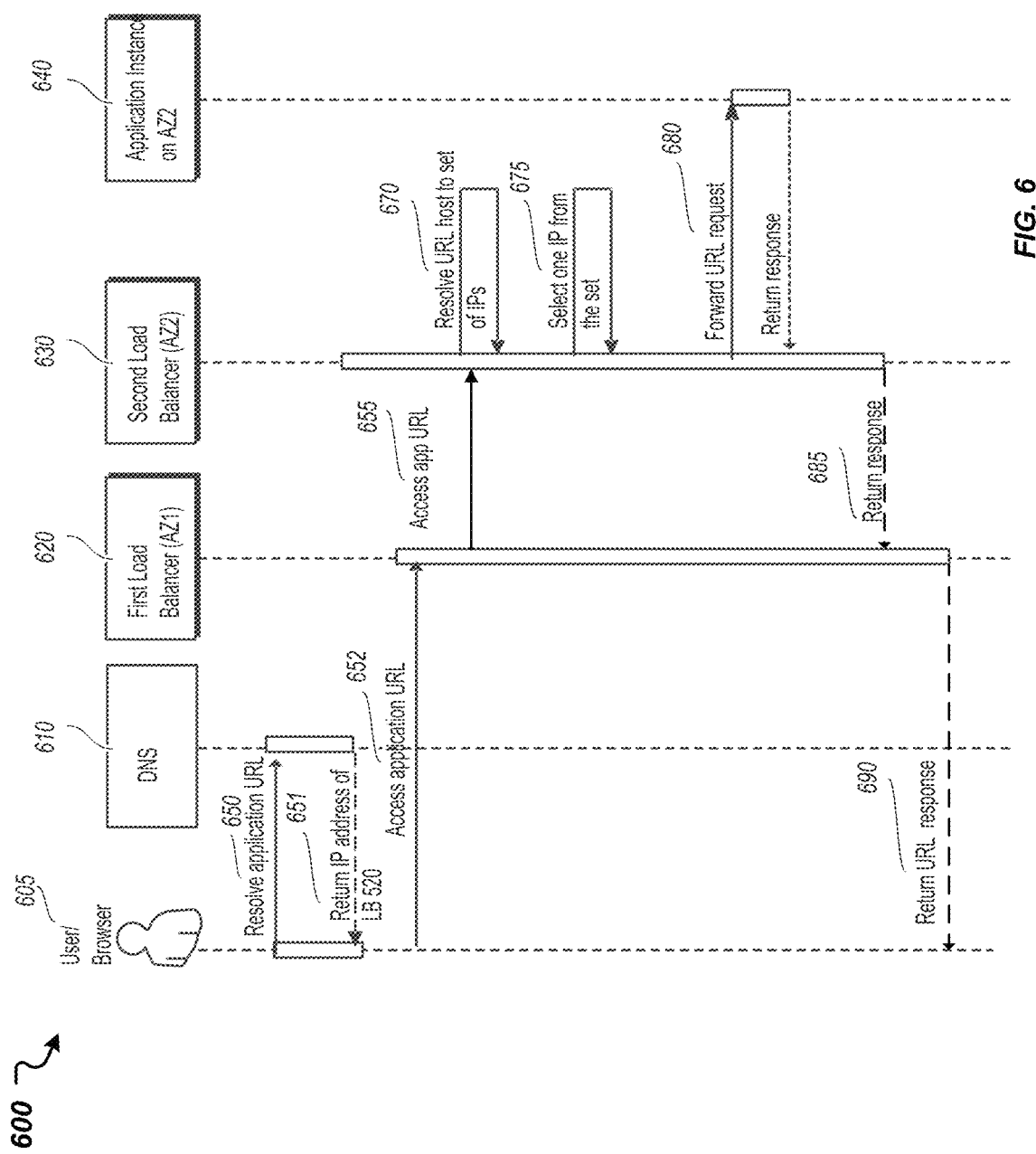
FIG. 6 is a block diagram for an example method for accessing a cloud application running on a multiple availability zone cloud platform in accordance with implementations of the present disclosure.

FIG. 6 is a block diagram for an example method 600 for accessing a cloud application running on a multiple availability zone cloud platform in accordance with implementations of the present disclosure. The example method 600 is associated with processing requests to access a cloud application deployed on a multiple availability zone cloud platform in cases where an outage at one of the AZs is identified. In some instances, the cloud application can be deployed with multiple instances that run at one or more of the zones of the multiple availability zone cloud platform.

In some instances, the example method 600 is executed at a multiple availability zone cloud platform corresponding to the cloud platform 200 of FIG. 2. In some instances, the example method 600 is executed in a corresponding manner to the example method 500 of FIG. 5, where the first AZ is experiencing an outage. For example, the first AZ can experience a network connectivity outage, an infrastructure outage, power supply issues, or other type of an outage. In cases where the first AZ experience outages, the AZ may be unresponsive to requests, and thus may be unavailable to provide services from instances of applications that run on the first AZ. The first AZ may not serve as an entry point for the incoming requests, since requests that are routed to a load balancer in the first AZ would fail. If the first AZ is not responsive, other AZs of the multiple availability zone cloud platform may be in a responsive and/or productive mode and can serve requests for services provided by instances running on the cloud platform 200. Thus, in case of an identified outage at one AZ, incoming traffic to the cloud platform can be processed at an active AZ.

In some instances, if the first AZ (that is experiencing outages) has been setup in an active mode, then the setup can be switched (or altered), and the first AZ may be set to a passive mode. In such instances, a second AZ from the multiple AZ of the cloud platform that are responsive (e.g., does not experience issues such as outages) can be set in active mode, for example, for handling incoming traffic at the cloud platform. In such cases, incoming requests for accessing cloud applications at the cloud platform can be processed by a load balancer at the second AZ. In some instances, an application manager at the second AZ can restrict routing requests from a load balancer at the second AZ for handling internal traffic to applications. In those instances, the restriction can be defined to limit the load balancer to redirect requests only to instances that are running at active AZs. Thus, the application manager can disable the load balancer to be able to route traffic to an application instance running at the first AZ.

In some more instances, if the first AZ is experiencing outages and is unable to respond to a request, applications and services that run at the other AZs may be configured to stop using database instances located at the first AZ and to switch to using databases that are located at the second AZ (or other active AZ if the multiple availability zone cloud platform includes more than two active AZs).

In some instances, if a cloud application is deployed only as one or more instances at the first AZ, and the first AZ is down, a request received for such a cloud application, may be rejected as the application does not have instances running in a healthy zone or otherwise active zone, such as, the second AZ in the illustrated example.

At 650, a user/browser 605 attempts to access an application running on the multiple availability cloud platform. For example, the browser can be a web browser that can send the request for accessing the cloud application to the cloud platform.

The user/browser 605 sends a request that includes an application location, e.g., a URL of the cloud application. The request for accessing the application is received at a domain name system (DNS) 610, where the DNS 610 determines a network address of a load balancer 620 that is handling incoming requests to the cloud platform based on the received application location. The load balancer 620 is a load balancer at an AZ that is in an active state, for example, that is the second AZ.

In some instances, in response to identifying that the first AZ is experiencing an outage, the load balancer at the first AZ can be places in or set to a passive mode, and a load balancer in an active AZ (e.g., the second AZ), can be set up to an active state. In some instances, load balancers at the protection layer of the cloud platform can be setup in an active-passive mode, where only an active load balancer in one of the AZs can be responsible to handle incoming traffic at a single time point.

At 651, the DNS 610 can return the network address of the first load balancer 620 to the user/browser 605. In some instances, the load balancer 620 can be a TCP/IP load balancer at a protection layer of the cloud platform that is responsible for handling incoming traffic. The load balancer 620 determined based on the resolving at the DNS 610 can be the load balancer in an active mode at a second AZ.

At 652, the user/browser 605 sends a request for accessing the application to the load balancer 620. At 655, the load balancer 620 sends a request for accessing the cloud application to a load balancer 630 at the same AZ of the load balancer 620, where the load balancer 630 is responsible for handling network traffic to applications and resources within the cloud platform. The load balancer 630 can be responsible for routing incoming traffic to different instances of the requested cloud application for accessing.

At 670, the load balancer 630 determines a set of application network addresses (e.g., IP addresses) that correspond to a host of the application location that is provided with the request 655. At 675, the load balancer 630 selects one of the application network addresses from the set. The load balancer 630 filters the set of the application network addresses to determine those addresses that are in an active AZs (i.e., the second AZ in the case of a first AZ experiencing an outage. Also at 675, the load balancer 630 can evaluate a filtered set of application network addresses and select one of the application network addresses based on a selection criterion. For example, a selection criterion may be implemented to determine the address based on a predefined algorithm. In some instances, a predefined algorithm for selecting an address may be based on an evaluation of a load of instances associated with the different addresses from the filtered set. In some other examples, the predetermined algorithm for selecting an address may be based on session identifiers, or can be based on a round robin scheduling algorithm. In some other examples, a scheduling scheme for determining which application instances is selected for an incoming request can be implemented based on one or more considerations associated with time constraints or an optimal number of parallel processed requests at an instance, among other examples of hardware or software conditions for processing incoming requests.

At 680, the load balancer 630 can forward the request including the application location to a cloud application instance 640 that is located at the second AZ, which is an AZ that is active and that does not currently experience outages or issues (or, alternatively, relatively less outages or issues than the first AZ).

In some instances, the instance of the cloud application 640 that receives the request can process the request, and a response can be returned to the load balancer 630. Then, at 685, the load balancer 630 returns the response from the instance cloud application 640, to the first load balancer 620, and, at 690, the load balancer 620 returns a response to the received request from 652. The response can be returned at 690 to the user/browser 605.

Figure 7:
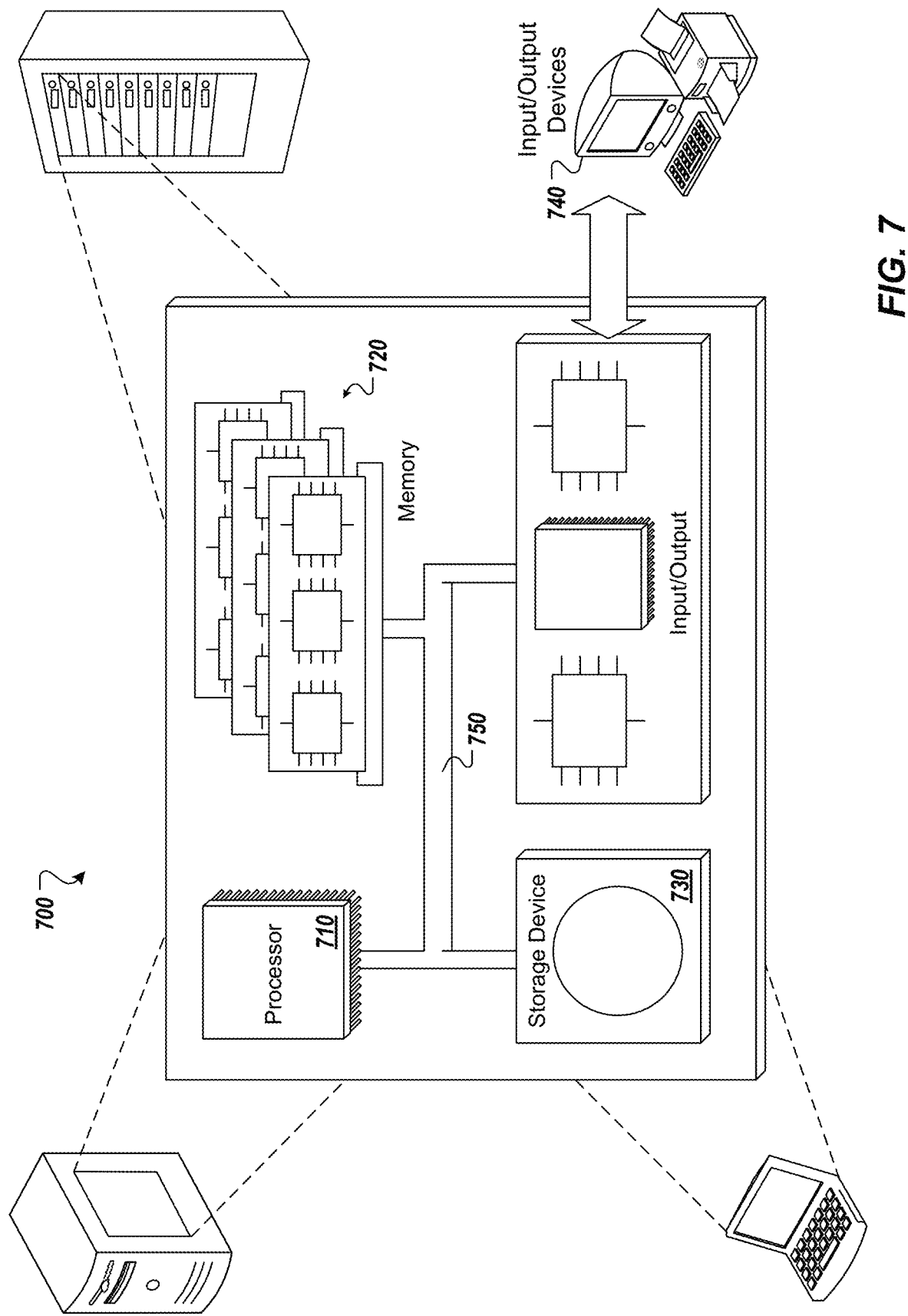
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, and 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also (alternatively) defined in accordance with the following examples:

Example 1. A computer-implemented method for running cloud applications on a multiple availability zone cloud platform, the method comprising:

receiving a request to access a cloud application running on the multiple availability zone cloud platform, wherein the request includes an application location for accessing the cloud application;

determining a network address corresponding to the application location of the cloud application;

in response to determining the network address, determining a first availability zone of the multiple availability zone cloud platform that is currently active to process the request;

at a first load balancer of the first availability zone, determining a plurality of network locations corresponding to a host component of the application location;

identifying a network location of the plurality of network locations for processing the request, wherein the network location is identified based on load balancing criteria of the multiple availability zone cloud platform, wherein the network location is associated with one of a plurality of availability zones of the multiple availability zone cloud platform; and providing the received request to the identified network location for processing by a first instance of the cloud application.

Example 2. The method of Example 1, wherein the application location is a uniform resource locator (URL), and wherein the network address is an Internet protocol (IP) address of a second load balancer included in a protection layer of the multiple availability zone cloud platform, wherein the protection layer is distributed between multiple availability zones.

Example 3. The method of Example 2, wherein the second load balancer is running at the first availability zone and is configured to redirect received requests to the first load balancer to route network traffic to entities running at the multiple availability zone cloud platform Example 4. The method of any one of the preceding Examples, wherein the multiple availability zone cloud platform includes a protection layer, wherein the protection layer comprises multiple instances of load balancers that each run at a different availability zone of the multiple availability zone cloud platform, and wherein the protection layer provides an active-passive setup for the multiple instances of load balancers.

Example 5. The method of any one of the preceding Examples, wherein the multiple availability zone cloud platform provides access to resources running as multiple instances distributed between one or more of a plurality of availability zones of the multiple availability zone cloud platform.

Example 6. The method of any one of the preceding Examples, further comprising:

in response to receiving a request to start a new application, automatically distributing instances of the new application at one or more of availability zones of the multiple availability cloud platform to balance processing load at availability zones of the multiple availability cloud platform.

Example 7. The method of any one of the preceding Examples, wherein a first availability zone and a second availability zone of the multiple availability zone cloud platform are connected through a highly available and high speed communication network.

Example 8. The method of any one of the preceding Examples, wherein the first availability zone and the second availability zones represent data centers that are hosted at two physical locations in close proximity.

Example 9. The method of Example 8, wherein the cloud application is running on the multiple availability zone cloud platform as multiple instances running at multiple availability zones, wherein the cloud application is associated with a database, wherein the database includes multiple instances running at one or more of the multiple availability zones of the cloud application, and wherein data between the multiple instances of the database is replicated in synchronous or asynchronous mode.

Example 10. The method of any one of the preceding Examples, wherein the cloud application is running on corresponding multiple availability zones as multiple instances of the cloud application, wherein the first instance of the cloud application is accessing resources stored at a database associated with the cloud application, wherein the cloud application accesses resources at a first instance of the database, wherein the first instance is determined from a plurality of instances of the database based on evaluation of capacities of the plurality of instances of the database to handle requests, and wherein the instances of the database are persisted at different availability zones and store same content.

Example 11. The method of any one of the preceding Examples, wherein determining the first availability zone of the multiple availability zone cloud platform comprises:

identifying an outage at a second availability zone of the multiple availability zone cloud platform; and in response to identifying the outage:

setting the second availability zone in a passive mode; and setting the first availability zone in an active zone to process the request, wherein the first availability zone is determined to be in a currently healthy state to process requests.

Example 12. The method of any one of the preceding Examples, wherein the cloud application is running on corresponding multiple availability zones as multiple instances of the cloud application including the first instance of the cloud application running at a first availability zone of the multiple availability zone cloud platform, wherein the method further comprising:

setting one or more instances of the multiple instance of the cloud application different from the first instances as disabled for processing requests, wherein the one or more instances are associated with an outage, wherein the outage is identified at one or more availability zone of the multiple availability zone cloud platform different from the first availability zone.

What is claimed is:

1. A computer-implemented method for running cloud applications on a multiple availability zone cloud platform, the method comprising:

receiving a request to access a cloud application running on the multiple availability zone cloud platform, wherein the request includes an application location for accessing the cloud application;

determining a network address corresponding to the application location for accessing the cloud application, wherein the network address is of a first load balancer included in a protection layer of the multiple availability zone cloud platform distributed between multiple availability zones, and wherein the first load balancer is configured to redirect the received request to a second load balancer to route traffic towards different instances of the cloud application hosted at a plurality of availability zones of the multiple availability zone cloud platform, wherein the routing is based on a registry maintained at the second load balancer that stores information for the different instances of the cloud application at the plurality of availability zones;

in response to determining the network address, determining a first availability zone of the multiple availability zone cloud platform that is active to process the request;

determining, at the second load balancer of the first availability zone, a plurality of network locations corresponding to a host component of the application location;

identifying a network location of the plurality of network locations for processing the request, wherein the network location is identified based on load balancing criteria of the multiple availability zone cloud platform, wherein the network location is associated with one of a plurality of availability zones of the multiple availability zone cloud platform; and providing the received request to the identified network location for processing by a first instance of the cloud application.

2. The method of claim 1, wherein the application location is a uniform resource locator (URL), and wherein the network address is an Internet protocol (IP) address of the second load balancer.

3. The method of claim 1, wherein the protection layer comprises multiple instances of load balancers that each run at a different availability zone of the multiple availability zone cloud platform, and wherein the protection layer provides an active-passive setup for the multiple instances of load balancers.

4. The method of claim 1, wherein the multiple availability zone cloud platform provides access to resources running as multiple instances distributed between one or more of a plurality of availability zones of the multiple availability zone cloud platform.

5. The method of claim 1, further comprising:
in response to receiving a request to start a new application, automatically distributing instances of the new application at one or more of availability zones of the multiple availability cloud platform to balance processing load at availability zones of the multiple availability cloud platform.

6. The method of claim 1, wherein a first availability zone and a second availability zone of the multiple availability zone cloud platform are connected through a high speed communication network.

7. The method of claim 6, wherein the first availability zone and the second availability zones represent data centers that are hosted at two physical locations in close proximity.

8. The method of claim 1, wherein the cloud application is running on the multiple availability zone cloud platform as multiple instances running at multiple availability zones, wherein the cloud application is associated with a database, wherein the database includes multiple instances running at one or more of the multiple availability zones of the cloud application, and wherein data between the multiple instances of the database is replicated in synchronous or asynchronous mode.

9. The method of claim 1, wherein the cloud application is running on corresponding multiple availability zones as multiple instances of the cloud application, wherein the first instance of the cloud application is accessing resources stored at a database associated with the cloud application, wherein the cloud application accesses resources at a first instance of the database, wherein the first instance is determined from a plurality of instances of the database based on evaluation of capacities of the plurality of instances of the database to handle requests, and wherein the instances of the database are persisted at different availability zones and store same content.

10. The method of claim 1, wherein determining the first availability zone of the multiple availability zone cloud platform comprises:
identifying an outage at a second availability zone of the multiple availability zone cloud platform; and
in response to identifying the outage:
setting the second availability zone in a passive mode; and
setting the first availability zone in an active zone to process the request, wherein the first availability zone is determined to be in a currently healthy state to process requests.

11. The method of claim 1, wherein the cloud application is running on corresponding multiple availability zones as multiple instances of the cloud application including the first instance of the cloud application running at a first availability zone of the multiple availability zone cloud platform, wherein the method further comprising:
setting one or more instances of the multiple instance of the cloud application different from the first instances as disabled for processing requests, wherein the one or more instances are associated with an outage, wherein the outage is identified at one or more availability zones of the multiple availability zone cloud platform different from the first availability zone.

12. A non-transitory, computer-readable medium coupled to one or more processors and having instructions stored thereon which, when executed by the one or more processors, cause the one or more processors to perform operations, the operations comprising:
receiving a request to access a cloud application running on a multiple availability zone cloud platform, wherein the request includes an application location for accessing the cloud application;
determining a network address corresponding to the application location for accessing the cloud application, wherein the network address is of a first load balancer included in a protection layer of the multiple availability zone cloud platform distributed between multiple availability zones, and wherein the first load balancer is configured to redirect the received request to a second load balancer to route traffic towards different instances of the cloud application hosted at a plurality of availability zones of the multiple availability zone cloud platform, wherein the routing is based on a registry maintained at the second load balancer that stores information for the different instances of the cloud application at the plurality of availability zones;
in response to determining the network address, determining a first availability zone of the multiple availability zone cloud platform that is active to process the request;
determining, at the second load balancer of the first availability zone, a plurality of network locations corresponding to a host component of the application location;
identifying a network location of the plurality of network locations for processing the request, wherein the network location is identified based on load balancing criteria of the multiple availability zone cloud platform, wherein the network location is associated with one of a plurality of availability zones of the multiple availability zone cloud platform; and
providing the received request to the identified network location for processing by a first instance of the cloud application.

13. The computer-readable medium of claim 12, wherein the application location is a uniform resource locator (URL), wherein the network address is an Internet protocol (IP) address of the second load balancer, wherein the second load balancer is running at the first availability zone, and wherein the protection layer comprises multiple instances of load balancers that each run at a different availability zone of the multiple availability zone cloud platform, and wherein the protection layer provides an active-passive setup for the multiple instances of load balancers.

14. The computer-readable medium of claim 12, further comprising instructions stored thereon which, when executed by the one or more processors, cause the one or more processors to perform operations, the operations comprising:

in response to receiving a request to start a new application, automatically distributing instances of the new application at one or more of availability zones of the multiple availability cloud platform to balance processing load at availability zones of the multiple availability cloud platform.

15. The computer-readable medium of claim 12, wherein determining the first availability zone of the multiple availability zone cloud platform comprises:
identifying an outage at a second availability zone of the multiple availability zone cloud platform; and
in response to identifying the outage:
setting the second availability zone in a passive mode; and
setting the first availability zone in an active zone to process the request, wherein the first availability zone is determined to be in a currently healthy state to process requests;
setting one or more instances of multiple instance of the cloud application different from the first instances as disabled for processing requests, wherein the one or more instances are associated with the outage, wherein the cloud application is running on corresponding multiple availability zones as multiple instances of the cloud application including the first instance of the cloud application running at the first availability zone of the multiple availability zone cloud platform.

16. A system comprising
at least one processor; and
a memory communicatively coupled to the at least one processor and having instructions stored thereon which, when executed by the processor, cause the processor to perform operations, the operations comprising:
receiving a request to access a cloud application running on a multiple availability zone cloud platform, wherein the request includes an application location for accessing the cloud application;
determining a network address corresponding to the application location for accessing the cloud application, wherein the network address is of a first load balancer included in a protection layer of the multiple availability zone cloud platform distributed between multiple availability zones, and wherein the first load balancer is configured to redirect the received request to a second load balancer to route traffic towards different instances of the cloud application hosted at a plurality of availability zones of the multiple availability zone cloud platform, wherein the routing is based on a registry maintained at the second load balancer that stores information for the different instances of the cloud application at the plurality of availability zones;
in response to determining the network address, determining a first availability zone of the multiple availability zone cloud platform that is active to process the request;
determining, at the second load balancer of the first availability zone, a plurality of network locations corresponding to a host component of the application location;
identifying a network location of the plurality of network locations for processing the request, wherein the network location is identified based on load balancing criteria of the multiple availability zone cloud platform, wherein the network location is associated with one of a plurality of availability zones of the multiple availability zone cloud platform; and
providing the received request to the identified network location for processing by a first instance of the cloud application.

17. The system of claim 16, wherein the application location is a uniform resource locator (URL), wherein the network address is an Internet protocol (IP) address of a second load balancer, and wherein the second load balancer is running at the first availability zone.

18. The system of claim 16, wherein the protection layer comprises multiple instances of load balancers that each run at a different availability zone of the multiple availability zone cloud platform, and wherein the protection layer provides an active-passive setup for the multiple instances of load balancers.

19. The system of claim 16, wherein the memory further comprises instructions stored thereon which, when executed by the processor, cause the processor to perform operations, the operations comprising:
in response to receiving a request to start a new application, automatically distributing instances of the new application at one or more of availability zones of the multiple availability cloud platform to balance processing load at availability zones of the multiple availability cloud platform,
wherein determining the first availability zone of the multiple availability zone cloud platform comprises:
identifying an outage at a second availability zone of the multiple availability zone cloud platform; and
in response to identifying the outage:
setting the second availability zone in a passive mode; and
setting the first availability zone in an active zone to process the request, wherein the first availability zone is determined to be in a currently healthy state to process requests;
setting one or more instances of the multiple instance of the cloud application different from the first instances as disabled for processing requests, wherein the one or more instances are associated with the outage, wherein the cloud application is running on corresponding multiple availability zones as multiple instances of the cloud application including the first instance of the cloud application running at the first availability zone of the multiple availability zone cloud platform.

\* \* \* \* \*